United States Patent
Kim et al.

(10) Patent No.: US 8,952,652 B2
(45) Date of Patent: Feb. 10, 2015

(54) SYSTEM AND METHOD FOR CHARGING BATTERY PACK

(71) Applicant: LG Chem, Ltd., Seoul (KR)

(72) Inventors: Do-Youn Kim, Daejeon (KR); Su-Min Park, Daejeon (KR); Ji-Eun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/675,491

(22) Filed: Nov. 13, 2012

(65) Prior Publication Data

US 2013/0063088 A1 Mar. 14, 2013

Related U.S. Application Data

(63) Continuation of application No. PCT/KR2011/002787, filed on Apr. 19, 2011.

(30) Foreign Application Priority Data

Jun. 8, 2010 (KR) ........................ 10-2010-0053885

(51) Int. Cl.
| | |
|---|---|
| H02J 7/14 | (2006.01) |
| H02J 7/04 | (2006.01) |
| B60L 11/18 | (2006.01) |
| H02J 7/00 | (2006.01) |
| B60L 1/00 | (2006.01) |

(52) U.S. Cl.
CPC .............. *H02J 7/042* (2013.01); *B60L 11/1816* (2013.01); *B60L 11/185* (2013.01); *H02J 7/14* (2013.01); *H02J 7/0027* (2013.01); *H02J 7/0054* (2013.01); *B60L 1/006* (2013.01); *Y02T 10/7005* (2013.01); *Y02T 10/7088* (2013.01); *Y02T 90/121* (2013.01); *Y02T 90/128* (2013.01); *Y02T 90/14* (2013.01)
USPC .......................................... 320/104; 320/109

(58) Field of Classification Search
USPC .......................................................... 320/104
See application file for complete search history.

(56) References Cited

U.S. PATENT DOCUMENTS

| | | | |
|---|---|---|---|
| 4,617,506 A | 10/1986 | Bogie et al. | |
| 5,583,418 A | 12/1996 | Honda et al. | |
| 7,002,265 B2 | 2/2006 | Potega | |
| 7,193,393 B1 * | 3/2007 | Payne | ........................... 320/119 |
| 8,183,821 B2 | 5/2012 | Sakurai | |
| 2008/0297103 A1 | 12/2008 | Windsor | |
| 2009/0096410 A1 * | 4/2009 | Sakurai | ........................ 320/109 |
| 2009/0309547 A1 * | 12/2009 | Nakatsuji | ...................... 320/134 |
| 2011/0266996 A1 | 11/2011 | Sugano | |

FOREIGN PATENT DOCUMENTS

| | | |
|---|---|---|
| JP | 11-27807 A | 1/1999 |
| JP | 2002-234376 A | 8/2002 |
| JP | 3123576 U | 6/2006 |

(Continued)

*Primary Examiner* — Edward Tso
*Assistant Examiner* — Robert Grant
(74) *Attorney, Agent, or Firm* — Birch, Stewart, Kolasch & Birch, LLP

(57) ABSTRACT

Disclosed are a system and method for charging a battery pack. The system uses a recovery vehicle to quickly charge a vehicle battery pack. The system includes a charging power supply module equipped in the recovery vehicle, quick charging power lines placed in the vehicle battery pack, a quick charge switch placed in the quick charging power lines, and a control module.

9 Claims, 3 Drawing Sheets

(56) References Cited

FOREIGN PATENT DOCUMENTS

| | | |
|---|---|---|
| JP | 2009-061935 A | 3/2009 |
| JP | 2009-95157 A | 4/2009 |
| KR | 10-0134765 B1 | 4/1998 |
| KR | 20-1998-0009847 U | 4/1998 |
| KR | 10-2008-0017157 A | 2/2008 |
| WO | WO 2008/102543 A1 | 8/2008 |
| WO | WO 2010/049775 A2 | 5/2010 |

* cited by examiner

SYSTEM AND METHOD FOR CHARGING BATTERY PACK

CROSS-REFERENCE TO RELATED APPLICATION

This application claims priority under 35 USC 119(a) to Korean Patent Application No. 10-2010-0053885 filed in the Republic of Korea on Jun. 8, 2010, the entire contents of which are incorporated herein by reference.

TECHNICAL FIELD

The present disclosure relates to a system and method for charging a battery pack, and more specifically to a system and method for quickly charging a battery pack of a vehicle using a quick-charging battery pack mounted in a recovery vehicle.

BACKGROUND ART

Along with the recent rapidly increasing demand for portable electronic products, such as notebook computers, video cameras and mobile phones, and the accelerated development of energy storage batteries, robots, satellites, etc., considerable research has been conducted on high-performance secondary batteries capable of repeated charging/discharging.

Currently commercially available secondary batteries include nickel-cadmium batteries, nickel-metal hydride batteries, nickel-zinc batteries and lithium secondary batteries. Lithium secondary batteries can be charged and discharged freely because there is little to no memory effect and have very low self-discharge rate and high energy density. Due to these advantages, lithium secondary batteries have received a great deal of attention compared to nickel-based secondary batteries.

On the other hand, carbon energy resources have gradually depleted and interest in environmental issues has steadily risen. Under such circumstances, demand for hybrid and electric vehicles has been continuously increasing worldwide, including the United States, Europe, Japan and Korea. Since hybrid and electric vehicles receive driving force from the charge/discharge energy of the battery packs, they have high fuel efficiency and release reduced amounts or no amount of pollutants into the environment in comparison with engine driven vehicles. From the viewpoint of economic efficiency and environmental protection, hybrid and electric vehicles have received a positive consumer response. Thus, more attention and research have been concentrated on vehicle batteries as key components of hybrid vehicles and electric vehicles.

Hybrid and electric vehicle batteries use their discharge energy. For this inherent reason, hybrid and electric vehicle batteries may be fully discharged. To protect a battery of a general electric or hybrid vehicle from being fully discharged, the charging state of the battery is displayed on a gauge on a driver's seat to inform the driver of the remaining charge amount. In addition, an alarm system is mounted such that when the remaining charge amount of a battery is at a predetermined level or below, a warning lamp is lit or a warning sound is generated to inform a driver that his/her vehicle needs charging. However, a vehicle battery may be fully discharged in many cases, for example, when a driver travels through an area where there is no electric charging station, fails to find an electric charging station during travelling, or does not recognize or forget to watch the warning lamp indicating a full discharge of the battery and continues to travel. A full discharge of a vehicle battery may also take place after the vehicle has been left unused for a long time in a state in which the remaining charge amount of the vehicle battery is low.

Generally, there are no serious problems that come with a fully discharged battery since one can just stop using the portable product for some time. Unlike other portable products, however, a fully discharged battery of an electric or hybrid vehicle requires immediate charging. Particularly, since an electric vehicle is only driven by a battery, it is impossible to use upon full discharge. Accordingly, in situations where a battery of a vehicle a driver must use is fully discharged or in a case where the battery is fully discharged while travelling outside his/her residence, immediate charging of the vehicle battery is required.

In such a situation, unless at a place where the vehicle battery can be charged, the driver must call a tow truck and ask to tow the vehicle to a place where the battery can be charged. However, additional costs must be paid, the longer the time it takes to tow the vehicle. In addition, when a vehicle is being towed, there is an inconvenience for the driver and/or passengers having to uncomfortably ride the tow truck and if the number of passengers exceeds the number of available seats on the tow truck, the passengers will either have to ride the vehicle being towed or find some other form of transportation. Not only is this cumbersome but also increases the risks of an accident, which could also lead to fatally threatening the lives of many people.

DISCLOSURE

Technical Problem

The present disclosure is designed to solve the problems of the prior art, and therefore it is an object of the present disclosure to provide a system and method for quickly charging a fully discharged battery pack of a vehicle using a charging device equipped in a recovery vehicle without the need to tow the vehicle to a place where the fully discharged battery pack can be quickly charged.

Other objects and advantages of the present disclosure will be understood by the following description and will become more apparent from embodiments of the present disclosure. It will also be apparent that the objects and advantages of the present disclosure can be embodied by the means as set forth in the appended claims and combinations thereof.

Technical Solution

According to an aspect of the present disclosure, there is provided a system for quickly charging a vehicle battery pack using a recovery vehicle, the system including: a charging power supply module equipped in the recovery vehicle to supply quick charging power to the vehicle battery pack; quick charging power lines placed in the vehicle battery pack to provide charging paths through which the charging power supplied from the charging power supply module is provided to battery cells of the vehicle battery pack; a quick charge switch placed in the quick charging power lines to selectively open or close the charging paths; and a control module adapted to turn off a charge control switch and a discharge control switch placed in a charging/discharging path of the vehicle battery pack and to turn on the quick charge switch when the connection of the charging power supply module to the quick charging power lines is sensed, so that the charging power is provided to the battery cells.

Preferably, the charging power supplied by the charging power supply module is adjustable.

Preferably, the charging power supply module monitors the charging state of the vehicle battery pack.

Preferably, the charging power supply module receives power from an electric generator equipped in the recovery vehicle or an external power source.

According to another aspect of the present disclosure, there is provided a method for quickly charging a vehicle battery pack using a recovery vehicle, the method including: (S1) mounting a charging power supply module in the recovery vehicle to supply quick charging power to the vehicle battery pack; (S2) placing quick charging power lines in the vehicle battery pack to provide charging paths through which the charging power supplied from the charging power supply module is provided to battery cells of the vehicle battery pack, and placing a quick charge switch in the quick charging power lines to selectively open or close the charging paths; (S3) connecting the charging power supply module to the quick charging power lines; (S4) turning off a charge control switch and a discharge control switch placed in a charging/discharging path of the vehicle battery pack; (S5) turning on the quick charge switch; and (S6) supplying the charging power from the charging power supply module to the vehicle battery pack.

Preferably, the charging power supplied by the charging power supply module is adjustable.

Preferably, the method further includes monitoring the charging state of the vehicle battery pack by the charging power supply module.

Preferably, the charging power supply module receives power from an electric generator equipped in the recovery vehicle or an external power source.

Advantageous Effects

According to the present disclosure, a fully discharged battery pack of an electric or hybrid vehicle can be quickly charged using a recovery vehicle. Therefore, the vehicle can be easily charged on the spot without the need to tow the vehicle to a place where the vehicle battery pack can be charged. In addition, since the vehicle does not need to be towed, a considerable amount of time and cost for towing is saved and the occurrence of possible accidents during towing is prevented.

Furthermore, according to an embodiment of the present disclosure, the charging power supplied by a charging device equipped in a recovery vehicle can be adjusted. Therefore, the charging power can be supplied from the same recovery vehicle to various kinds of vehicles.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
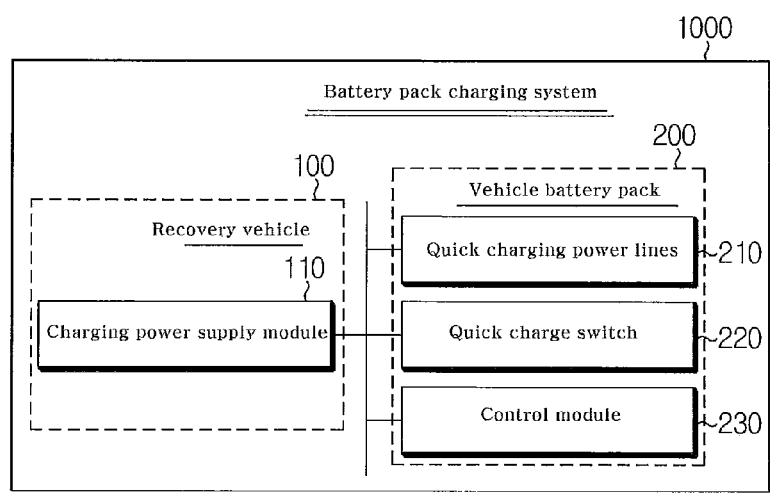
FIG. 1 is a block diagram schematically illustrating the functional constitution of a battery pack charging system according to a preferred embodiment of the present disclosure.

FIG. 1 is a block diagram schematically illustrating the functional constitution of a battery pack charging system 1000 according to a preferred embodiment of the present disclosure.

Referring to FIG. 1, the battery pack charging system 1000 includes a charging power supply module 110, quick charging power lines 210, a quick charge switch 220 and a control module 230.

The charging power supply module 110 is equipped in a recovery vehicle 100. The recovery vehicle 100 refers to a vehicle for supplying charging power to a vehicle battery pack 200. The present disclosure is not limited to a specific kind, form, name, driver, etc. of the recovery vehicle 100 so long as the charging power supply module 110 is included in the recovery vehicle 100. Various kinds of recovery vehicles may be used in the present disclosure. For example, the recovery vehicle 100 may be a vehicle that is owned or run by a particular service provider or a vehicle insurer who provides a charging power supply service. The recovery vehicle 100 may be any ordinary vehicle and is equipped with the charging power supply module 110 but runs without intending to provide a charging power supply service as a main purpose.

The charging power supply module 110 supplies power to quickly charge the battery pack. To supply power, the charging power supply module 110 may include means adapted to store power to be supplied for charging the battery pack. The power storage means may be a high-capacity battery.

The power stored in the power storage means may be supplied from an electric generator equipped in the recovery vehicle 100 or an external power source. For example, the power storage means is constructed to receive power from an electric generator connected to an engine of the recovery vehicle 100. Due to this construction, the engine-driven recovery vehicle 100 can be automatically charged during running. Alternatively, the power storage means can store power supplied from an external power source, such as a 220-volt power source for household use.

On the other hand, there are generally many cases where an electric or hybrid vehicle must be urgently used after charging of the battery using the recovery vehicle 100. Thus, it would be desirable to rapidly charge the battery within a time (i.e. quick charging) is shorter than the usual charging time. For quick charging, it is preferred that the recovery vehicle 100 supplies its maximum charging power within the permissible charging power range of the vehicle battery.

The charging power supply module 110 is preferably capable of adjusting the charging power. The chargeable voltage of a battery pack mounted in an electric or hybrid vehicle may vary depending on the kind of the battery pack or the vehicle. The charging power supply module 110 is applicable to various kinds of electric and hybrid vehicles since the charging power supplied by the charging power supply module 110 is adjustable.

More preferably, the charging power supply module 110 can receive information on the kind of the vehicle battery pack 200 or the kind of a vehicle equipped with the vehicle battery pack 200. Examples of such information include the manufacturer and model name of the vehicle and the serial number of the battery pack. The information may be inputted from a user of the recovery vehicle 100. For instance, a driver of the recovery vehicle 100 may input the model name of the vehicle through input means provided on the driver's seat. Alternatively, when the charging power supply module 110 is connected to the quick charging power lines 210, the information may be allowed to be automatically transmitted from the battery pack or the vehicle equipped with the battery pack.

After the information on the kind of the vehicle is inputted, it is desirable for the charging power supply module 110 to automatically control the amount of the charging power to the maximum charging power of the battery pack mounted in the vehicle.

It is preferred that the charging power supply module 110 monitors the charging state of the vehicle battery pack 200. If the maximum charging power is supplied to quickly charge the vehicle battery pack 200, a burden may be imposed on the vehicle battery pack 200 and an abnormal state (e.g., overcharge) may take place in the battery pack. Therefore, it is preferred to allow the charging power supply module 110 to continuously monitor the charging state of the battery pack.

When the occurrence of an abnormal situation (e.g., overcharge) is sensed in the charging state of the vehicle battery pack 200, it is desirable for the charging power supply module 110 to allow the control module 230 to block the charging paths. Preferably, the charging power supply module 110 transmits a block signal to the control module 230 to allow the control module 230 to turn off the quick charge switch 220. Continuous supply of the charging power to the battery pack without blocking the charge paths despite the occurrence of an abnormal situation may lead to the damage or explosion of the battery pack.

Figure 2:
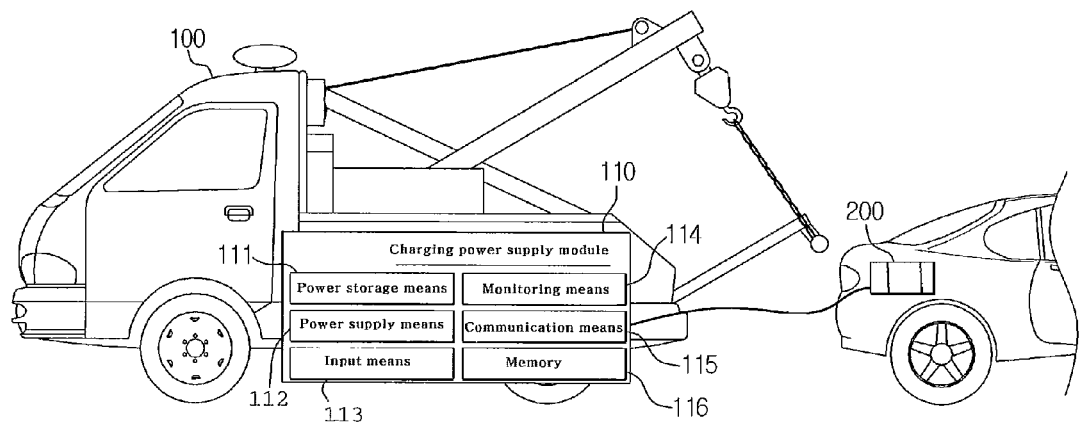
FIG. 2 is a block diagram schematically illustrating the functional constitution of a charging power supply module according to an embodiment of the present disclosure.

FIG. 2 is a block diagram schematically illustrating the functional constitution of the charging power supply module 110 according to an embodiment of the present disclosure.

Referring to FIG. 2, the charging power supply module 110 is equipped in the recovery vehicle 100 and includes power storage means 111, power supply means 112, input means 113, monitoring means 114, communication means 115 and a memory 116.

The power storage means 111 stores charging power to be supplied to the vehicle battery pack 200, and the power supply means 112 supplies the power stored in the power storage means 111 to the vehicle battery pack 200. The amount of the charging power supplied by the power supply means 112 may vary depending on the kind of a vehicle in need of charging or the kind of the battery pack.

The input means 113 receives information on the operation of the charging power supply module 110 from a user. For example, the input means 113 may receive a command to start charging from a driver of the recovery vehicle 100 or a model name of a vehicle in need of charging or the battery pack mounted in the vehicle.

The monitoring means 114 monitors the charging state of the vehicle battery pack 200 to determine whether an abnormal situation takes place in the course of charging of the vehicle battery pack 200. The communication means 115 transmits and receives necessary data to/from the vehicle battery pack. For example, when the occurrence of overcharge is sensed by the monitoring means 114, the communication means 115 may transmit the sensed information to the control module 230 or may receive, for example, information on the completion of charging from the control module 230.

The memory 116 stores necessary data that allow other means, including the power storage means 111, the power supply means 112, the input means 113, the monitoring means 114 and the communication means 115, to perform their functions. For example, the memory 116 stores the permissible charging power range of the vehicle battery depending on the model name of the vehicle or the battery pack, and transmits information on the permissible charging power range to the power supply means 112 when a driver of the recovery vehicle 100 inputs the model name of the vehicle.

The quick charging power lines 210 are placed in the vehicle battery pack 200 in need of charging. The quick charging power lines 210 serve as charging paths through which the charging power supplied from the charging power supply module 110 is provided to battery cells of the vehicle battery pack 200.

To supply charging power, each of the quick charging power lines 210 may include a connection terminal at one end thereof to which the charging power supply module 110 is connected. The other ends of the quick charging power lines 210 are connected to battery cells in parallel. With this connection, the charging power is provided from the charging power supply module 110 to the battery cells.

The quick charge switch 220 selectively opens or closes the charging paths through the quick charging power lines 210. Therefore, although the charging power supply module 110 is connected to the quick charging power lines 210, the charging power is not immediately provided from the charging power supply module 110 to the battery cells by the opening/closing operation of the quick charge switch 220. If the charging power supply module 110 is connected without the quick charge switch 220, excessive power may be immediately supplied to the battery cells, causing damage to the battery cells, or the power may be supplied to other units (e.g., a motor) of the vehicle, causing destruction of the units. Therefore, the quick charge switch 220 is an element adapted to control the feeding of power from the charging power supply module 110.

The control module 230 senses whether the charging power supply module 110 is connected to or disconnected from the quick charging power lines 210. To this end, sensing lines may be placed between the control module 230 and the quick charging power lines 210 to perform a function of sensing the connection of the charging power supply module 110. For example, when a difference between potential values inputted in both terminals of the sensing lines is constant, the control module 230 senses the connection of the charging power supply module 110. However, the present disclosure is not necessarily limited to this sensing mode and the control module 230 can sense the connection of the charging power supply module 110 in various modes. For example, the control module 230 can directly receive, from the communication means 115 of FIG. 2, information that the charging power supply module 110 is already connected.

After the connection between the charging power supply module 110 and the quick charging power lines 210 is sensed, the control module 230 turns off a charge control switch and a discharge control switch. That is, the control module 230 blocks the charging paths to prevent the power supplied from the charging power supply module 110 from being supplied to other units (e.g., a motor) of the vehicle or power other than the power supplied from the charging power supply module 110 from being supplied to the battery cells.

Then, the control module 230 turns on the quick charge switch 220. As a result, the power from the charging power supply module 110 can be supplied to the battery cells of the vehicle battery pack 200 to quickly charge the vehicle battery pack 200.

On the other hand, the control module 230 is preferably realized by a battery manage system (BMS). The 'BMS' refers to a system that collectively controls the charge/discharge operation of a battery pack. However, the present disclosure is not necessarily limited to this embodiment of the control module 230. The control module 230 may be constituted separately from BMS. Alternatively, the control module 230 may be separately constituted outside the battery pack.

Figure 3:
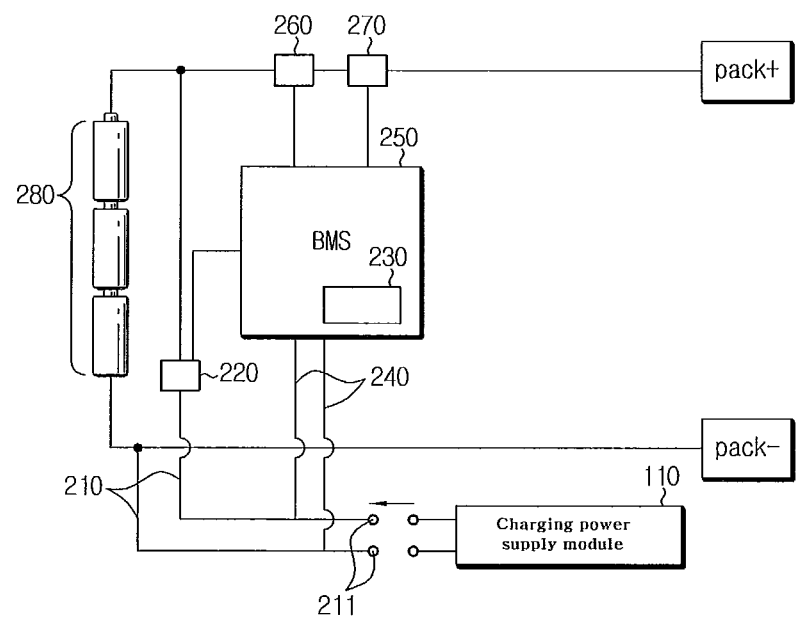
FIG. 3 is a diagram illustrating an exemplary connection constitution of a battery pack charging system in a vehicle battery pack.

FIG. 3 is a diagram illustrating an exemplary connection constitution of the battery pack charging system 1000 of the present disclosure in the vehicle battery pack 200.

Referring to FIG. 3, the vehicle battery pack 200 generally includes battery cells 280, a charge control switch 260, a discharge control switch 270 and a BMS 250. One end of each quick charging power lines 210 of the battery pack charging system 1000 of the present disclosure is connected to the battery cells 280 in parallel, and the other ends thereof constitute connection terminals 211 to which the charging power supply module 110 is connected. A quick charge switch 220 is placed in the quick charging power lines 210. In FIG. 3, the control module 230 is realized by the BMS 250. Sensing lines 240 are connected between the BMS 250 and the quick charging power lines 210 to sense the connection of the charging power supply module 110.

The sensing lines 240 sense whether the charging power supply module 110 equipped in the recovery vehicle 100 is connected to the connection terminals 211 of the quick charging power lines 210. The sensing lines 240 can sense the connection of the quick charging power line 210 using a potential difference between the connection terminals 211. After the connection of the quick charging power line 210 is sensed, the BMS 250 turns off the charge control switch 260 and the discharge control switch 270. Then, the BMS 250 turns on the quick charge switch 220 to form charging paths. Finally, the charging power is supplied from the charging power supply module 110 to the battery cells 280, and as a result, charging of the vehicle battery pack 200 is initiated.

Figure 4:
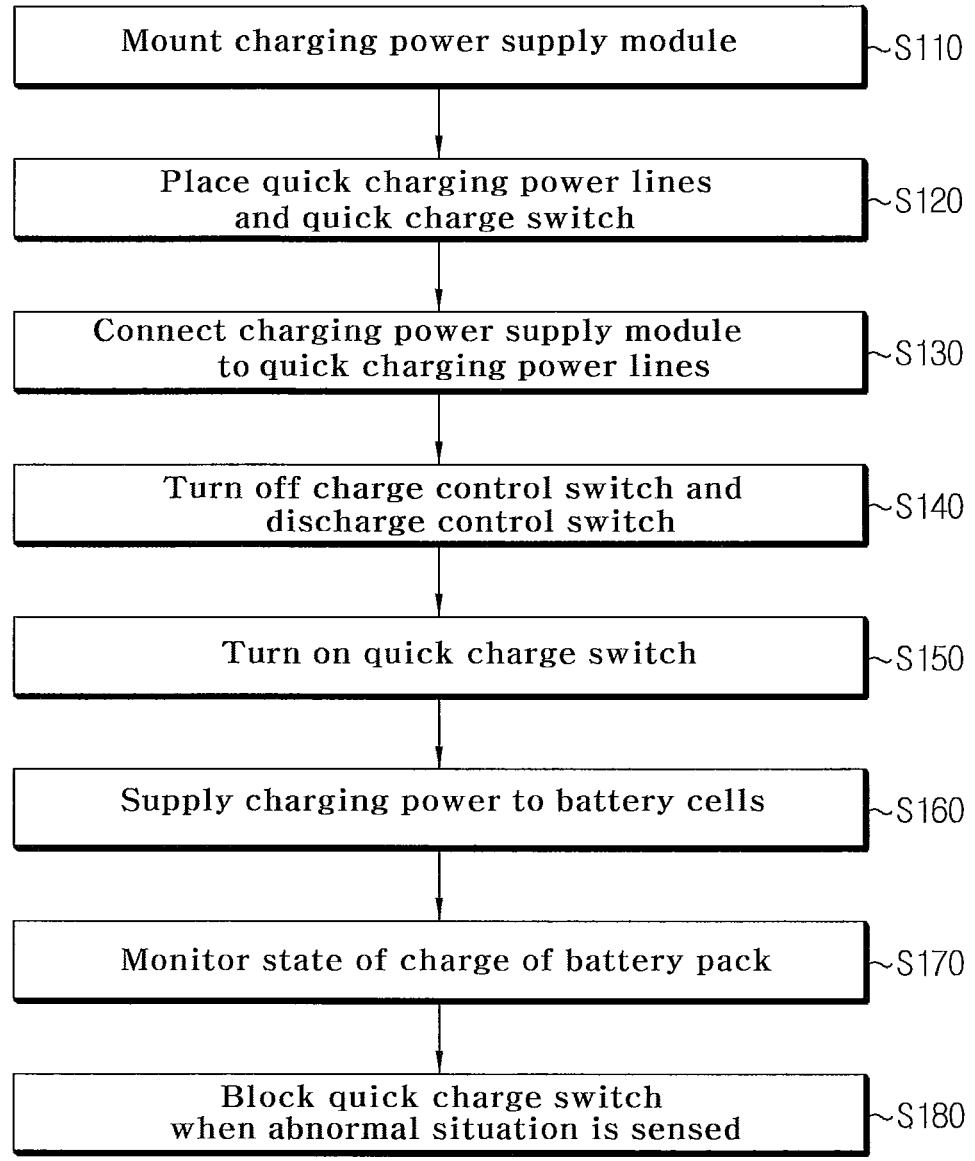
FIG. 4 is a flowchart schematically illustrating a method for quickly charging a battery pack according to an embodiment of the present disclosure.

FIG. 4 is a flowchart schematically illustrating a method for quickly charging a battery pack according to an embodiment of the present disclosure.

Referring to FIG. 4, first, a charging power supply module is mounted in a recovery vehicle to supply quick charge power to the battery pack (S110). Then, quick charging power lines serving as charging paths, through which the charging power supplied from the charging power supply module is provided to battery cells of the vehicle battery pack, are placed in the vehicle battery pack, and a quick charge switch are placed in the quick charging power lines to selectively open or close the charging paths. Next, when the charging power supply module is connected to the quick charging power lines (S130), a control module turns off a charge control switch and a discharge control switch placed in a charging/discharging path of the vehicle battery pack (S140). Then, the quick charge switch is turned on (S150) to allow the charging power to be supplied from the charging power supply module to the vehicle battery pack (S160).

The charging power supply module can receive and store power from an electric generator equipped in the recovery vehicle or an external power source.

The charging power supplied by the charging power supply module is adjustable. If the charging power supply module receives information on the kind of the vehicle battery pack or the kind of a vehicle equipped with the vehicle battery pack prior to S160, the amount of the charging power can be automatically controlled depending on the information in S160.

As illustrated in FIG. 4, the method may further include monitoring the charging state of the vehicle battery pack by the charging power supply module (S170). The method may further include blocking the quick charge switch when an abnormal situation is sensed in the charging state of the vehicle battery pack in S170.

Although the present disclosure has been described herein with reference to the foregoing embodiments and accompanying drawings, it is not limited thereto. Those skilled in the art will appreciate that various changes and modifications can be made within the technical spirit of the present disclosure and the scope of the appended claims and their equivalents.

It is obvious to those skilled in the art that the terms "module" and "means" used herein just represent logic constituent units, which do not necessarily mean physically separable elements.

What is claimed is:

1. A system for quickly charging a vehicle battery pack using a recovery vehicle, the system comprising:
   a charging power supply module equipped in the recovery vehicle to supply quick charging power to the vehicle battery pack;
   quick charging power lines placed in the vehicle battery pack, separately from a charging/discharging path of the vehicle battery pack, to provide charging paths through which the charging power supplied from the charging power supply module is provided to battery cells of the vehicle battery pack;
   a quick charge switch placed in the quick charging power lines to selectively open or close the charging paths; and
   a control module adapted to:
   sense the connection of the charging power supply module to the quick charging power lines,
   turn off a charge control switch and a discharge control switch placed in the charging/discharging path of the vehicle battery pack, and
   turn on the quick charge switch when the connection of the charging power supply module to the quick charging power lines is sensed, so that the charging power is provided to the battery cells,
   wherein the charging power supply module is configured to receive information on a kind of the vehicle battery pack from the vehicle battery pack or a vehicle equipped with the vehicle battery pack when the charging power supply module is connected to the quick charging power lines, and automatically adjust the amount of the charging power depending on the kind of the vehicle battery pack.

2. The system according to claim 1, wherein the charging power supply module monitors the charging state of the vehicle battery pack.

3. The system according to claim 2, wherein when an abnormal situation is sensed in the charging state, the charging power supply module transmits a block signal to turn off the quick charge switch to the control module.

4. The system according to claim 1, wherein the charging power supply module receives power from an electric generator equipped in the recovery vehicle or an external power source.

5. The system according to claim 1, wherein the control module is realized by a battery manage system (BMS) equipped in the vehicle battery pack.

6. A method for quickly charging a vehicle battery pack using a recovery vehicle, the method comprising:
- (S1) mounting a charging power supply module in the recovery vehicle to supply quick charging power to the vehicle battery pack;
- (S2) placing quick charging power lines in the vehicle battery pack, separately from a charging/discharging path of the vehicle battery pack, to provide charging paths through which the charging power supplied from the charging power supply module is provided to battery cells of the vehicle battery pack, and placing a quick charge switch in the quick charging power lines to selectively open or close the charging paths;
- (S3) sensing the connection of the charging power supply module to the quick charging power lines;
- (S3-1) receiving, by the charging power supply module, information on a kind of the vehicle battery pack from the vehicle battery pack or a vehicle equipped with the vehicle battery pack when the charging power supply module is connected to the quick charging power lines;
- (S3-2) automatically adjusting, by the charging power supply module, the amount of the charging power depending on the kind of the vehicle battery pack;
- (S4) turning off a charge control switch and a discharge control switch placed in the charging/discharging path of the vehicle battery pack;
- (S5) turning on the quick charge switch; and
- (S6) supplying the charging power from the charging power supply module to the vehicle battery pack.

7. The method according to claim 6, further comprising monitoring the charging state of the vehicle battery pack by the charging power supply module.

8. The method according to claim 7, further comprising turning off the quick charge switch when an abnormal situation is sensed in the charging state during the monitoring.

9. The method according to claim 6, wherein the charging power supply module receives power from an electric generator equipped in the recovery vehicle or an external power source.

* * * * *